Nov. 10, 1964   W. H. HOPPER, JR., ETAL   3,156,828
PROTECTIVE CONTROL FOR PARALLELED ALTERNATOR SYSTEMS
Filed March 30, 1959   3 Sheets-Sheet 2
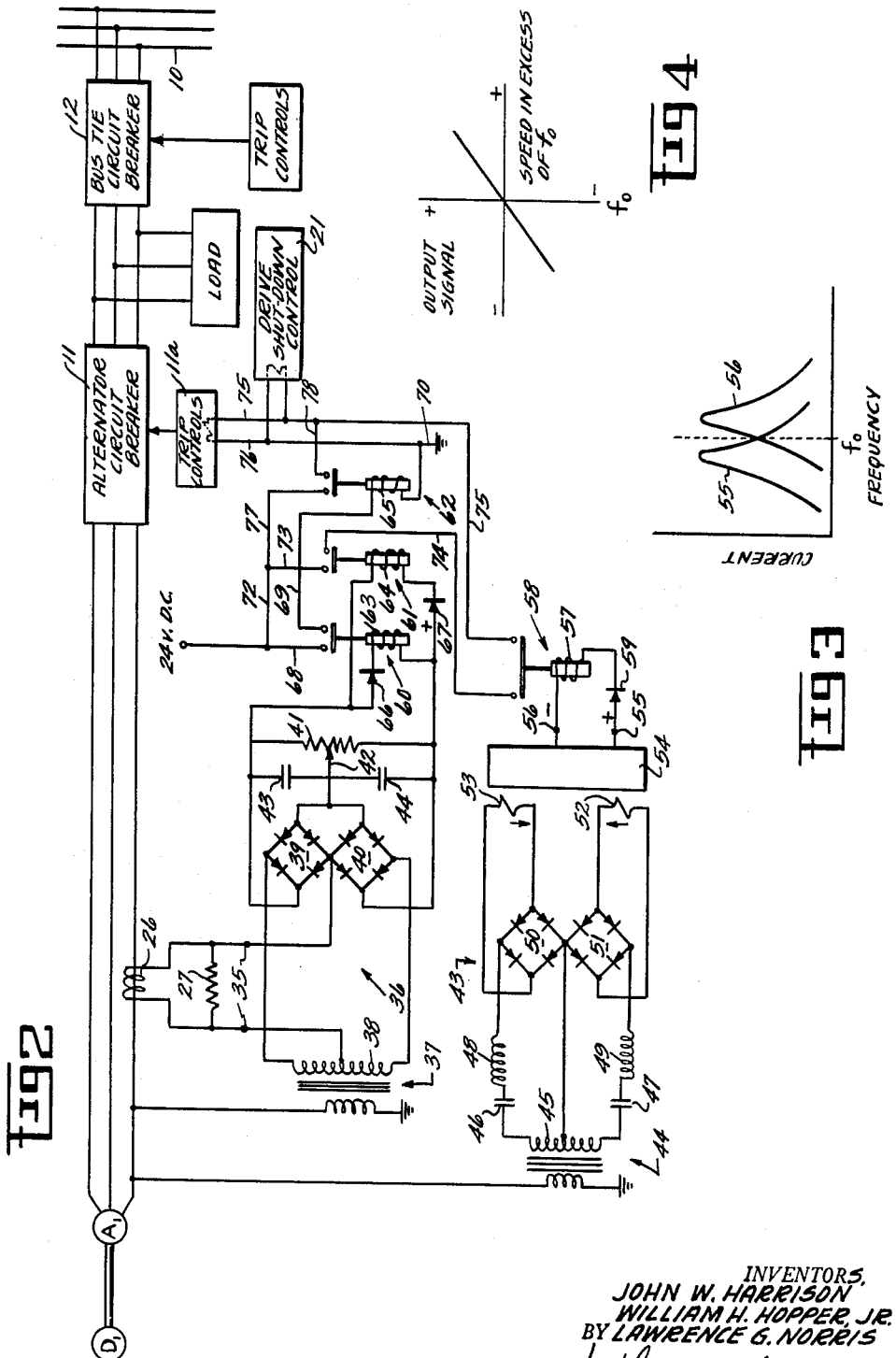
INVENTORS,
JOHN W. HARRISON
WILLIAM H. HOPPER, JR.
BY LAWRENCE G. NORRIS
Lawrence G. Norris
ATTORNEY—

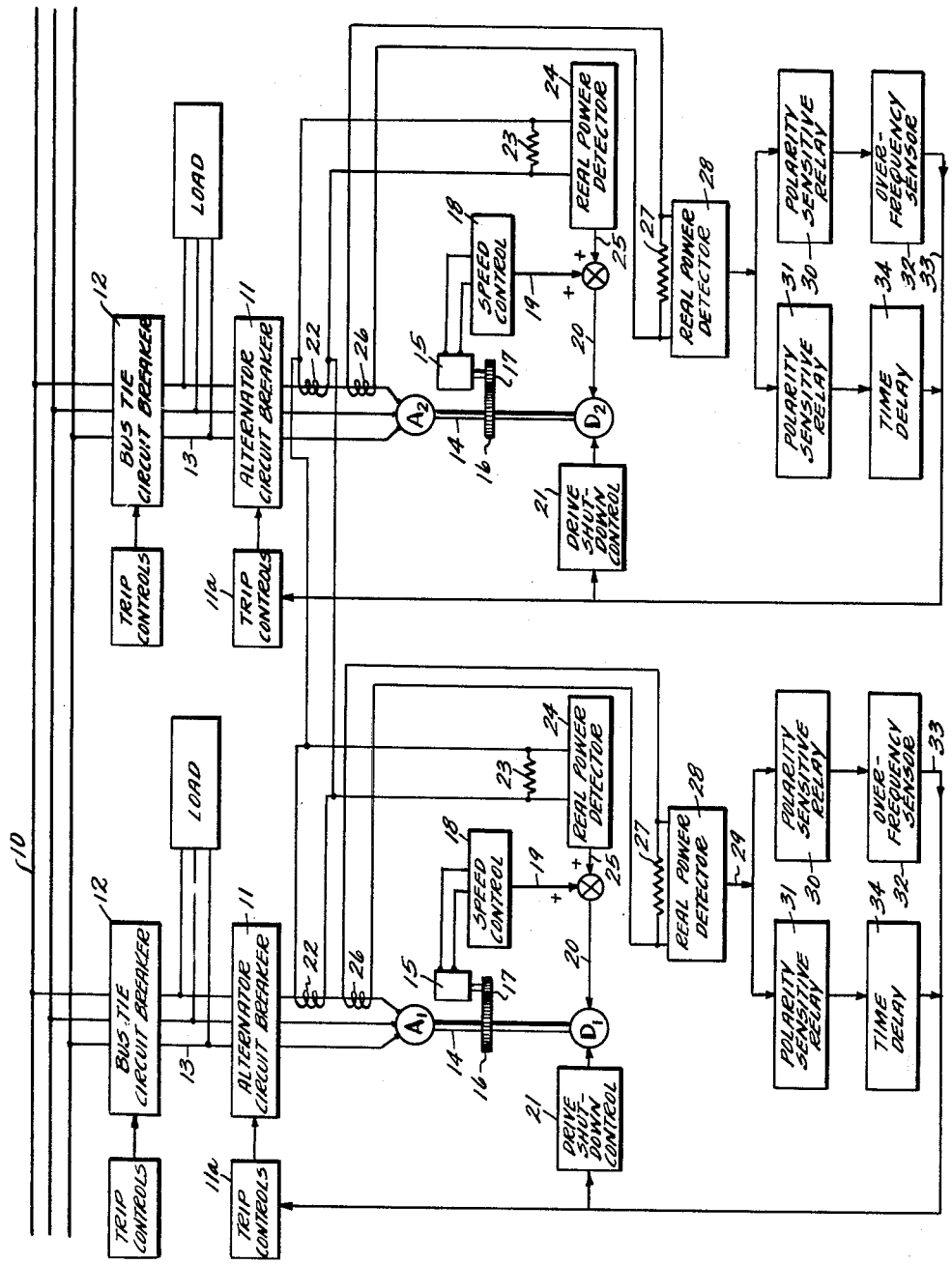

United States Patent Office 3,156,828
Patented Nov. 10, 1964

3,156,828
PROTECTIVE CONTROL FOR PARALLELED
ALTERNATOR SYSTEMS
William H. Hopper, Jr., Lynn, Lawrence G. Norris, Marblehead, and John W. Harrison, Danvers, Mass., assignors to General Electric Company, a corporation of New York
Filed Mar. 30, 1959, Ser. No. 802,849
6 Claims. (Cl. 307—57)

Our invention relates to protective controls for electric power systems utilizing two or more alternators operating in parallel on a common bus. Our invention is particularly applicable to generating systems in which two or more alternators are operated in parallel and isochronously, i.e. with substantially no steady state speed change over the normal load range.

Systems of the foregoing type are commonly used in aircraft, the alternators being driven by some form of so-called "constant speed drive" which may be in the form of an air turbine, a hydraulic drive or some other type of device capable of delivering a substantially constant steady state output speed over a desired operating load range.

One of the problems associated with such systems arises from the necessity for separating a drive and its alternator from the rest of the system in the event of a malfunction in that unit. This problem may be demonstrated by considering, by way of example, a system of paralleled alternators driven isochronously by air turbine drives. Each of the air turbine drives is provided, in accordance with the common practice, with an overspeed trip system capable of shutting down the drive in the event its speed reaches a preselected overspeed level indicating a malfunction in the primary speed regulating apparatus of the drive.

It will be appreciated that with the alternators of the system all tied together electrically through a common bus, the steady state speed of all drives must remain equal in order to remain in step with the bus frequency and to maintain load division. In the event, then, that a malfunction occurs in one of the drive control systems so as to cause that drive to begin increasing its speed beyond its normal operating speed, the other alternators on the line will be carried along at the same speed as the failed unit.

This will be the case even though the primary control systems of the remaining drives sense a speed error and close down the air supply to the turbines, since reverse torque will be transmitted electrically from the bus to each of the other alternators on the line to hold them in step with the failed unit. Thus, assuming sufficient energy is available to the failed drive, the entire system is brought up in speed by the failed drive into the overspeed trip range.

In the event that the failed drive happens to have an overspeed trip setting which is somewhat lower than any of the other drives in the system, it will be tripped out to remove the difficulty without damage to the integrity of the remainder of the system. If this is not the case, however, it will be appreciated that any drive having a lower or approximately equal overspeed trip setting as the failed unit will be forced into being tripped out of the system even though that drive has sustained no malfunction. In addition, depending upon the magnitude of the time lag inevitably present in the overspeed trip system, all drives may be tripped out regardless of the trip settings because of the continued acceleration of the system beyond the first trip out speed.

It will be appreciated, therefore, that in the type of system just described, a malfunction in a single drive can result in a loss of the complete electrical system. It has been a common practice to provide protection against such an occurrence by providing an overrunning clutch between each drive and its associated alternator. The overrunning clutch permits the transmission of torque in the forward or driving direction but overruns when the transmission of torque in the reverse direction is attempted. Thus, in the event of a malfunction in one of the drives, all of the alternators in the system may remain on the bus and be carried up in speed along with the failed unit, by overrunning their drives while all drives except the failed one continue to operate at their normal operating speed. The failed unit is therefore permitted to attain its trip out speed and be removed from the system without disturbing the remaining drives or the integrity of the system.

A second type of malfunction that creates a problem in systems of this type is that which causes speed depression of one of the drives. Such a malfunction may be, for example, a bearing failure within the drive which produces a drag on the unit of such a magnitude that the drive is incapable of maintaining synchronous speed. Under these conditions the failed drive will extract reverse power from the bus and tend to drag the system frequency down.

The overrunning clutch also provides a limited protection against failures of the latter type. By allowing the alternator to overrun its failed drive, the drive is permitted to be depressed in speed without placing a drag on the system.

It will be appreciated, however, that in both of the above mentioned types of failures, the overrunning clutch provides protection for the system only and not for the individual drives. It does this by mechanically isolating each drive from its alternator in the direction of power transmission from the system to the drive. Thus the drive is prevented from extracting power from the system.

This means that each drive must rely on its own individual protective system to finally clear the difficulty. Thus, the overrunning clutch is not really a protective system in the sense that it produces any corrective action in response to a malfunction. It merely isolates the difficulty to the individual drive so that the paralleled system is not disturbed. Even in such a case, however, it will be recognized that in the event of an overspeed type failure of one drive, the system can be damaged if the overspeed protective system of the drive fails to function.

In view of the foregoing, it is an object of our invention to provide a protective system for paralleled alternator power systems which provides protection against failures of the above mentioned type, but which, as opposed to the overrunning clutch type of system, provides an output signal in response to drive malfunctions, the output signal being connectible to the system protective equipment to isolate the failed drive without reliance on the individual protective system of the drive. In other words, we propose to provide, in addition to the normal drive speed and load division controls, an additional control which performs a positive system protective function without relying on the protective control of the drive itself.

It is another object of our invention to provide a novel protective system for paralleled alternator systems to provide protection against malfunctions of the type described above, but which does not require the utilization of an overrunning clutch.

It is still another object of our invention to provide a novel protective system of the foregoing type in which electrical means are provided for detecting the particular drive or drives in which a malfunction has occurred.

It is a further object of our invention to provide an improved electrical protective system of the foregoing type in which certain selected parameters of the system are compared electrically to produce a tripping signal in the event of a drive malfunction of the type described above.

Briefly stated, our invention contemplates the provision of protection against individual drive malfunctions in a paralleled system by scanning the system over some preselected overspeed range and tripping out any drive which is transmitting a positive or driving torque in excess of a preselected magnitude, while retaining on the line those units which are receiving reverse power from the bus. In one embodiment of our invention, we accomplish this by providing electrical means associated with each drive which respond to the simultaneous occurrence of the transmission of power in the normal or positive direction together with the existence of an overspeed condition falling within a preselected excess speed range, but which are insensitive to the existence of either of these conditions singly. In addition, we provide electrical means sensitive to the transmission of a preselected magnitude of reverse power for tripping the associated drive out in the event the condition persists for a predetermined length of time, although no overspeed condition exists. The latter arrangement provides protection against failures, such as bearing failures within the drive, which tend to drag the system down by extracting power from the bus as opposed to those which deliver excess power to the bus to accelerate the system.

Various other objects and advantages of our invention will be apparent from the following description taken in connection with the accompanying drawings in which:

FIG. 1 is a schematic presentation of a paralleled alternator system embodying the protective arrangement of our invention;

FIG. 2 is a schematic presentation of a mechanization of the system of FIG. 1;

FIGS. 3 and 4 are graphical presentations of the characteristics of certain of the elements utilized in the arrangement of FIG. 2.

Figure 5:
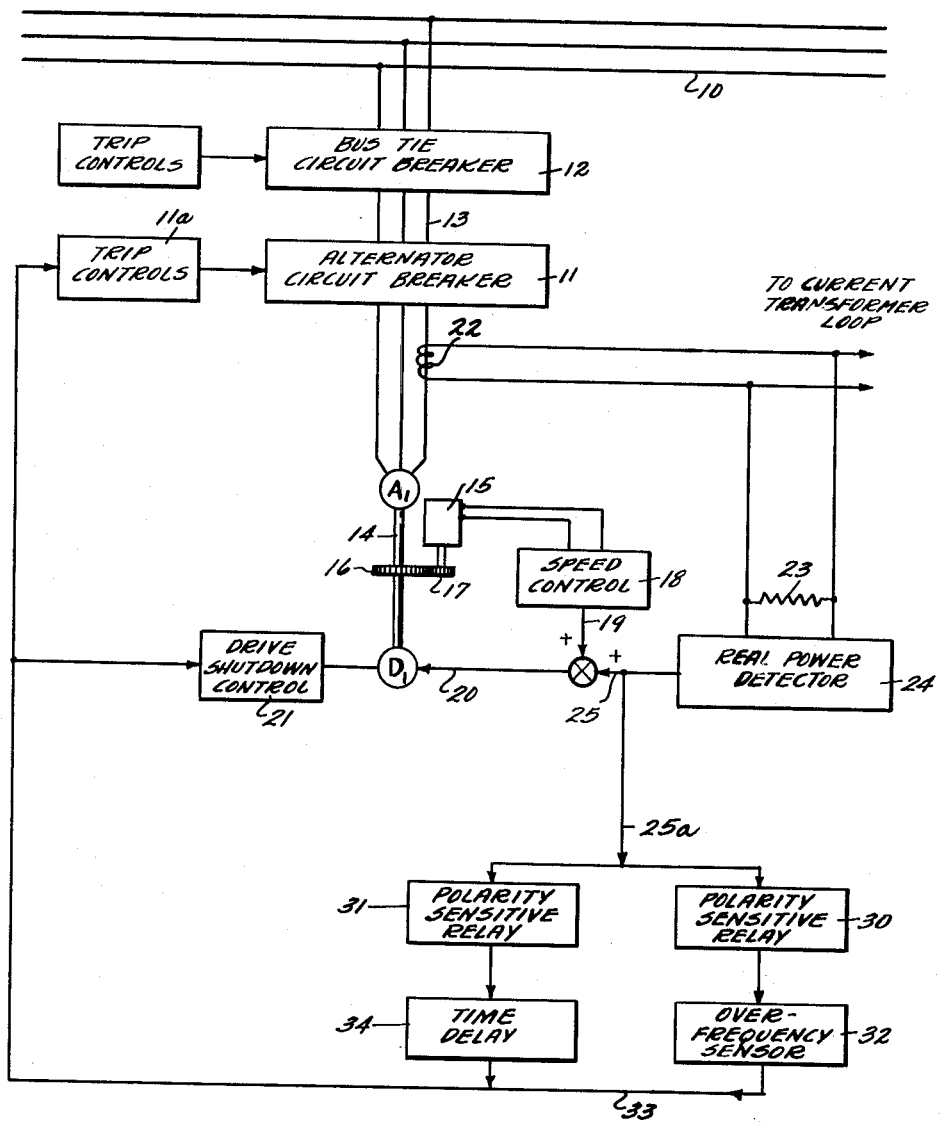
FIG. 5 is a schematic presentation of an alternative form of our invention.

Referring now in particular to the arrangement of FIG. 1 there is shown in schematic form a paralleled alternator system having two alternators A1 and A2 connected to a common three phase bus 10 through alternator circuit breakers 11 and bus tie circuit breakers 12. The system loads are connected to load buses 13 which extend between the alternator circuit breakers and the bus tie circuit breakers as shown. The alternator circuit breakers may be opened and closed by means of suitable trip controls represented schematically at 11a and the bus tie circuit breakers may be operated in a similar manner by controls which are not shown in the schematic because they perform no function in the operation of the system presented.

Although the system is shown with only two alternators being utilized, it will be recognized that the system presented is intended to apply to paralleled systems utilizing any number of alternators with the particular systems shown being duplicated to accommodate the number of alternators selected.

It will be seen from the discussion of the schematic of the system presented thus far that all system loads may be supplied from any single alternator or any combination of alternators. For instance, it will be seen that if the alternator circuit breaker on the alternator A1 is opened, and the alternator circuit breaker on the alternator A2 is closed along with the two bus tie breakers 12, both loads may be supplied from the single alternator A2. With both alternator circuit breakers closed, however, the system is designed to provide for division of the load between alternators A1 and A2. A typical load division system will be discussed in detail at a later point in the description.

Description of Individual Drive Controls

The alternators A1 and A2 are driven by constant speed drives D1 and D2 capable of driving the alternators at a substantially constant speed over the normal load range. The constant speed drives are connected to drive the alternators through suitable mechanical means, usually involving a gear reduction, all of which is schematically represented by the connections 14.

Each of the drives is provided with a speed control system capable of sensing any deviations in the speed of the drive from a preselected desired operating speed, and of regulating the amount of energy delivered to the drive to maintain the preselected speed level. In the case of a hydraulic type of drive, the speed is regulated by controlling the speed ratio of the drive whereas in a typical air turbine type of drive, the speed is regulated by controlling the amount of air delivered to the drive, usually by means of a throttle valve or the like. The speed sensing element itself may take the form of a flyball governor capable of detecting speed error, and in the case of an air turbine drive, of controlling the position of the input valve as a function of speed error.

For convenience of illustration, we have shown electrical type speed controls in the particular system shown in FIG. 1. These comprise tachometer generators 15, which are driven through suitable gear means 16 and 17 at a speed proportional to the speed of the drive. The tachometer generators thus produce an output voltage, the frequency of which is directly proportional to the speed of the drive. The outputs of the tachometer generators 15 are connected to electro-mechanical speed controls illustrated schematically at 18, which include means for detecting any frequency deviations in the output frequency of the tachometer generators from a preselected frequency corresponding to the desired speed of the drive. The detection of a speed error results in the delivery of a signal to the speed regulating element of the drive calling for a correction in speed back to the preselected level. The output of the speed control is represented schematically by lines 19 and 20.

Assuming for purposes of illustration that the drives D1 and D2 are both of the air turbine type, there would normally be provided in each drive an emergency overspeed control system capable of shutting down the drive in the event of a malfunction in the primary speed regulating system. This portion of the control is represented schematically at 21 and is of a form capable of being actuated by a suitable overspeed sensor such as a spring bolt type of unit which is caused to operate upon the attainment of a preselected speed level in excess of the normal operating speed.

In addition to the provision of a speed regulating control for each individual drive, it is also necessary to provide control apparatus for regulating the load division between alternators. The function of this control is to regulate the power input of each drive to its alternator in such a manner as to cause the total load on the system to be substantially equally divided among the units operating on the common bus. A typical control of this kind is illustrated in FIG. 1 and comprises a transformer loop made up of an interconnected loop of current transformers 22, each of which is connected to produce an output current proportional to the line current flowing in one of the phases of the alternator to which it is connected. Connected across each current transformer is a signal resistor 23. When the load is balanced equally between the alternators A1 and A2, the currents flowing in the two transformers 22 will be exactly equal so that no differential current will flow in either of the resistors 23. However, in the event of a load unbalance between the alternators, currents will be caused to flow in the resistors 23, the phase and magnitude of which currents are proportional to both the magnitude and the direction of the load unbalance. The load unbalance sensed thus far, however, includes both real and reactive power and it is, therefore, necessary to connect the signals produced across the resistors 23 to real power detectors 24, each of which senses only that portion of the signal representing the real power component. The load unbalance signal is fed into the speed control in an additive fashion as represented schematically by the line 25, and acts upon the drive in approximately the same manner as a speed error signal to produce an adjustment in the amount of energy being delivered by each drive to its alternator so as to correct the load unbalance. A load division system of this general type for paralleled alternators is shown in U.S. Patent No. 2,590,023—E. E. Lewis et al., issued March 18, 1952 and assigned to the same assignee as the present invention.

Thus, as will be seen from the foregoing, each of the drive and alternator systems is provided with an individual speed regulating apparatus capable of controlling the speed of the unit to a preselected desired level and in addition, a load division regulating system is provided which cooperates with the speed control apparatus to maintain a divided load between the drives. The system illustrated is of the so-called isochronous variety in that a substantially constant operating speed, and consequently constant bus frequency, is maintained over the full operating load range.

As has been already discussed, in systems of the type just described, a malfunction in one of the drives may result in the loss of the entire electrical system. In the case of the overrunning clutch type of protective system, the clutch mechanism would normally be placed in the mechanical interconnection 14 between the drive and the alternator. We provide a system, however, which does not require the utilization of an overrunning clutch and which provides significant advantages over the overrunning clutch type of system.

Description of Protective System Schematic

In order to protect the system against malfunction of the type previously discussed, we provide an arrangement for selecting the individual drive or drives in which a malfunction has occurred so that that particular drive and its associated alternator may be tripped out of the system. In the embodiment shown in FIG. 1, considering, for purposes of description, only one of the two identical systems illustrated, we accomplish this by providing real power detecting apparatus in the form of a current transformer 26 having a signal resistor 27 connected across its output terminals and coupled together with a real power detector shown schematically at 28. It will be appreciated that the current flowing in the signal resistor 27, and hence the voltages across the resistor, is directly proportional to the total real and reactive power being delivered by the alternator to which the system is connected. The real power detector 28 performs the function of selecting that portion of the signal voltage appearing across the resistor 27 which is proportional to the real power being delivered by the alternators.

Thus, the output 29 of the real power detector is a signal which is proportional to both the magnitude and direction of the power being delivered from or to the particular alternator to which the detecting system is connected. The real power signal appearing at 29 is connected to two polarity sensitive relays 30 and 31, the relay 30 being sensitive only to a signal representing a preselected magnitude of positive power being delivered by the alternator, and the relay 31 being sensitive only to a signal representing a preselected magnitude of reverse power being delivered to the alternator. The polarity sensitive relay 30 is connected to an overfrequency sensor 32, the function of which is to determine whether simultaneously with the existence of a signal having the polarity and magnitude such as to activate the relay 30, there exists also an overspeed or overfrequency condition falling within a preselected speed or frequency range. In the event both of these conditions are satisfied, an output signal is produced at 33. This signal is connected to activate the trip controls 11a of the alternator circuit breaker 11 so as to open the breaker and isolate the alternator from the load bus 13, the bus tie-breaker 12 remaining closed to allow the load of that alternator to be supplied from the bus 10. We have found it desirable in some cases to also introduce the output signal of the overfrequency sensor 32 to the drive shutdown control 21 as shown so that the drive is also shut down at the same time that the alternator is isolated from the paralleled system. This merely provides a backup to the existing drive overspeed control, however, and is not necessary to accomplish the system protective function which is the primary objective of the arrangement of our invention.

In the event that the signal output of the real power detector appearing at 29 is of a magnitude and polarity such as to activate the polarity sensitive relay 31, a time delay relay 34 is caused to be activated and upon the expiration of a preselected length of time an output signal is produced at the output line 33. The output signal from the time delay relay activates the trip controls 11a of the alternator circuit breaker 11 in the same manner as the signal from the overfrequency sensor 32 to trip the alternator circuit breaker and isolate the alternator from the load bus 13, the bus tie circuit breaker 12 remaining closed. In this case again the signal may be also introduced to the drive shutdown control 21, it being more desirable to introduce the signal from the time delay relay to the drive shutdown control than was the case with the signal from the overfrequency sensor, because the drive is not normally provided with an underfrequency shutdown device, as will later be explained.

Thus, it will be appreciated that the appearance of an output signal at the line 33 through either of the two parallel paths just described will activate the trip controls 11a of the alternator circuit breaker to cause the alternator to be disconnected from the load bus 13 and, if desired, to also activate the drive shutdown control 21.

The polarity sensitive relay 30 is set to respond only to real power signals of a polarity such as to indicate that power is flowing out of the alternator and is insensitive to signals of a polarity such as to indicate that power is flowing into the alternator. Thus, the polarity sensitive relay 30 responds only to positive power signals. The relay 30 may also be set to respond only to positive power signals which are in excess of a preselected magnitude. The polarity sensitive relay 31, on the other hand, responds only to signals which are of such a polarity such as to indicate that power is flowing into the alternator from the bus, a condition which would be realized, for instance, upon the occurrence of a bearing failure in the drive, such as to cause a drag on the system.

The operation of the system just described will now be set forth for particular types of malfunctions.

Operation of System of FIG. 1 on Overspeed Failures

For purposes of description, it will be assumed that a malfunction occurs in one of the drive primary speed control systems and that the malfunction is of such a nature as to cause the drive to increase in speed, thus tending to increase the bus frequency and to carry up the remaining units on the bus. Initially, the load division system will act in a direction to still further increase the frequency of the bus, because it will increase the energy being delivered to the units which have not malfunctioned in an effort to keep the power outputs of these machines equal to that of the runaway drive. At a preselected load division error signal level, however, the output of the real load division system is caused to saturate and at a preselected overspeed condition, lower than that required to actuate the overspeed trip, the excess speed signal calling for a reduction in energy becomes the predominant one. Once the speed control signals exceed in magnitude the load division error signals, all drives receive from their speed controls a signal calling for a reduction in output. However, the only drives capable of responding to this signal are those whose control systems have not malfunctioned.

As a consequence of the foregoing sequence, it will be observed that if the system is scanned at a preselected overspeed level, the failed drive will be observed to be delivering a relatively large amount of positive power into the bus, because of its inability to respond to the requirements of its control, and those drives which are operating normally will be seen to be extracting power from the bus in order to maintain speed, because the speed controls of these drives have substantially entirely cut off the energy supplies to them. The output signal appearing at 29 of the real power detector 28 of the failed drive will therefore be such as to indicate a positive outflow from that alternator into the bus of a substantial amount of power. The real power detectors 28 of the non-malfunctioned units will, however, be producing signals which are approaching zero and going negative, depending upon the exact instant the system is scanned, indicating that these drives are cutting off their energy supplies and are beginning to extract reverse power from the bus.

The polarity sensitive relay 30 of the failed drive will therefore be activated by the signal from its real power detector whereas the polarity sensitive relays 30 of the remaining drives will not be activated. At the same time the overfrequency sensors 32 of all drives are activated as the bus frequency is raised into the preselected range. As will later be explained, this overfrequency range is selected so as to be in excess of normal operating frequencies, including transients, but less than that frequency at which the overspeed trip of the drive would be activated.

As a result of the foregoing sequence, it will now be observed that both the polarity sensitive relay 30 and the overfrequency sensor 32 of the failed drive have been activated whereas in the remaining drives the polarity sensitive relays 30 remain inactivated. An output signal will appear at the line 33, therefore, of the failed drive but not such signal will appear for those drives which have not malfunctioned. Thus, the trip controls 11a for the alternator circuit breaker of the failed machine will be activated and this unit will be tripped off the bus. Although not shown, the trip controls normally also include means for shorting out the current transformer 22 of any alternator which is removed from the bus so that it is removed from the current transformer loop of the load division system. As pointed out above, the drive shutdown control 21 of the failed drive may be activated at the same time to shut the unit down although the overspeed trip mechanism of that unit could be relied upon to shut the unit down after it had been removed from the bus.

It will be observed that with the system of FIG. 1, the maximum system frequency attained upon the occurrence of an overspeed failure of one of the drives is less than that which would occur with the overrunning clutch type of system, because in the latter system the frequency of the system must be brought up to the overspeed trip level of the failed drive before it is removed from the system. In addition, the system of FIG. 1 provides a separate protective function and does not rely upon the operation of the individual drive controls.

It will be observed that during the sequence described above the polarity sensitive relays 31 of those drives which have not malfunctioned receive a reverse power signal from the outputs 29 of their real power detectors 28. However, the time delay 34 is sufficiently long in comparison with the time required to activate the trip controls 11a of the failed drive through the polarity sensitive relay 30 and the overfrequency sensor 32 of the failed unit, such that the failed unit is tripped out and the system returned to normal operating conditions before an output signal can appear through the time delays 34 of those units which have not malfunctioned.

*Operation of System of FIG. 1 on Underspeed Failures*

Assume for purposes of description that a bearing failure occurs in one of the drives and that it is of such a nature as to absorb a relatively large amount of power, thus placing a drag on the electrical system tending to reduce the bus frequency. Assume further that the drive itself is incapable of supplying the power being absorbed by the failure and that the particular drive involved therefore begins to absorb power from the bus. The real power detector 28 of the failed drive will therefore produce an output signal at 29 indicating that reverse power is flowing from the bus and into the drive. The polarity sensitive relay 31 of that drive will therefore be activated whereas the polarity sensitive relay 30 will remain inactivated.

If the foregoing condition persists for a preselected length of time and is not cleared, the time delay interposed by relay 34 expires and an output signal appears at the line 33 of that unit which has sustained the bearing failure. The trip control 11a of the failed unit is therefore activated and the alternator circuit breaker 11 is opened to remove that unit from the bus. It may be desirable at the same time under these circumstances to trip the drive shutdown control 21 because the failure is of such a nature as not to activate the normal protective control of the drive itself.

It will be observed that throughout the foregoing sequence, those drives which have not sustained failures of the type described continue to produce a positive power output and to operate at the preselected system frequency, or possibly slightly below it, such that their protective controls are not activated. Thus, the unit which has sustained the failure is detected and removed from the system in the manner just described.

It will be observed that the system just described provides certain advantages over the overrunning clutch type of system for underspeed type failures. For instance, the system of FIG. 1 provides protection for bearing failures and the like which might occur in either the alternator or the drive, whereas the overrunning clutch, in only allowing the alternator to overrun its drive, does not provide any form of protection for failures of the kind just described which might occur in the alternator or at points between the overrunning clutch and the bus. In addition, the overrunning clutch type of system does not provide any output signal which is capable of providing any corrective action in that it merely allows the failed condition to remain and allows the system to overrun the failed unit. The system of FIG. 1, on the other hand, provides a positive protective function in that the failed unit is removed from the system, the output signal of the system also being available for the purpose of shutting down the drive if so desired.

*Mechanization of System of FIG. 1*

Referring now to FIG. 2, there is shown a typical mechanization of the system of FIG. 1, the graphical presentations of FIGS. 3 and 4 illustrating the characteristics of the overfrequency sensor element utilized in the configuration of FIG. 2. For purposes of description, it will be assumed that the configuration shown is a part of the protective system of the alternator and drive combination D1 and A1 of FIG. 1, and like numerals will be utilized to indicate like elements where appropriate.

Connected to sense the output current of one phase of the alternator A1 is a current transformer 26 having connected across its output terminals a signal resistor 27. As has been pointed out before, the voltage appearing across the signal resistor 27 is proportional to the total real and reactive power output of the alternator. This signal is connected to the terminals 35 of a real power sensing circuit 36 where the phase relationship of the voltage appearing across the terminals of the resistor 27 is compared to that of the alternator phase voltage of that phase in which the output current is sensed. The phase voltage of the alternator is introduced into the circuit 36 by means of a transformer 37 having a center tapped secondary winding 38. The voltage appearing across the signal resistor 27 is inserted into the center leg of the circuit as shown and the output of the circuit is subtractive in character by reason of the opposed relationship of a pair of diode bridges 39 and 40. The net output of the circuit appears across an output resistor 41 which is provided with a calibration adjustment 42 and a pair of filter capacitors 43 and 44. The net output signal of the real power sensor circuit 36 appearing across the resistor 41 reflects both the magnitude and the direction of the power flowing out of or in to the alternator A1. The operation of this type of circuit is described in greater detail in U.S. Patent 2,590,023—E. E. Lewis et al., issued March 18, 1952 and assigned to the same assignee as the present invention.

For purposes of the following description, the polarity of the load signal appearing across the output resistor 41 is assumed to be as indicated in FIG. 2 when the direction of power flow is out of the alternator and into the bus. When the direction of power flow is from the bus, and into the alternator, the polarity of the signal appearing across the output resistor 41 is opposite to that shown. In both instances, the magnitude of the signal is proportional to the magnitude of the power flowing.

Also forming a part of the arrangement shown in FIG. 2, is a frequency sensor arrangement 43, which may receive its input either from the alternator A1 as shown or from its control tachometer generator 15. The input to the circuit 43 is introduced through a transformer 44 having a center tapped secondary winding 45. The output legs of the secondary winding 45 are connected on one side through a series connected capacitor and inductor 46 and 48, and on the other side through a series connected capacitor and inductor 47 and 49 to diode bridges 50 and 51, which are in turn connected to a pair of input windings 52 and 53 of a magnetic amplifier 54.

The series characteristic of current flow versus frequency for the series combination of capacitor 46 and inductor 48 is shown in FIG. 3 by the curve 55 and the characteristic of the series connected capacitor 47 and inductor 49 is shown by the curve 56.

It will be observed that at some preselected frequency $f_0$, indicated in FIG. 3, the current flowing through the capacitor inductor combination 46–48, is exactly equal to the current flowing in the capacitor inductor combination 47–49. These two currents are introduced to the magnetic amplifier input windings 52 and 53 in opposed relationship as shown such that at the frequency $f_0$ the net output of the magnetic amplifier 54 is zero.

The output signal of the magnetic amplifier 54 for frequencies other than $f_0$ is shown in FIG. 4, the polarity signs corresponding to those marked in FIG. 2 at the output terminals 55 and 56 of the magnetic amplifier 54. It will be seen, therefore, that over a range of frequencies in the vicinity of $f_0$, the output signal of magnetic amplifier is proportional to magnitude of the frequency deviation from $f_0$.

The output of the magnetic amplifier is connected to the coil 57 of a relay 58 through a diode 59. It will be observed that the diode 59 blocks current flow from output voltages opposite in polarity to that shown so that only those signals generated by frequencies in excess of $f_0$ produce current flow in the relay coil 57. The contacts of the relay 58 are in the normally open position so that at some preselected frequency in excess of $f_0$, the relay 58 is activated by the signal from the magnetic amplifier 54 and is caused to close its contacts.

In addition to the relay 58, the circuit is provided with three other relays 60, 61 and 62 having respectively activating coils 63, 64 and 65. The relays 60 and 61 are made polarity sensitive by diodes 66 and 67 connected as shown such that relay 61 is activated by output voltages appearing across the output resistor 41 of the real power sensor 36 of the polarity shown, corresponding to positive power flow, and relay 60 is activated by signals opposite in polarity to that shown, corresponding to reverse power flow. The contacts of relays 60, 61 and 62 are normally in the open position as shown. Relay 62 is a time delay type of relay in that upon activation of its coil 65, a preselected time delay period must expire before the relay is actuated to close its contacts.

The contacts of relay 60 are connected to a 24 volt D.-C. supply and to the coil 65 of the relay 62 by conductors 68, 69 and 70, such that closing of the contacts of relay 60 connects the 24 volt D.-C. supply to the coil 65 of relay 62. The contacts of relays 58 and 61 are connected in series with each other to the direct current supply and to the trip coil 71 of the alternator circuit breaker trip controls 11a by conductors 72, 73, 74, 75 and 76. The contacts of relay 62 are connected to the direct current supply and to the trip coil 71 by conductors 72, 77 and 78. The drive shutdown trip coil 79 may also be connected so as to be activated at the same time as the trip coil 71 of the alternator circuit breaker.

Assuming that the circuit of FIG. 2 is connected to a drive which sustains an overspeed type failure having the characteristics previously described, a real load signal of substantial magnitude will appear across the output resistor 41, the polarity of the signal being as shown. This signal is of a polarity and magnitude such as to activate the coil 64 of relay 61 and close the contacts of relay 61, relay 60 remaining unactivated by reason of the blocking diode 66. As the frequency of the system is increased by the failed unit and exceeds frequency $f_0$ a signal of increasing magnitude appears at the output terminals 55 and 56 of the magnetic amplifier 54.

Upon the attainment of a preselected frequency in excess of $f_0$, the output signal of the magnetic amplifier becomes large enough to activate coil 57 of relay 58 and close its contacts. The closing of relay 58 completes a circuit from the direct current supply through the series connected contacts of relays 58 and 61 and through conductors 72, 73, 74, 75 and 76 to connect direct current supply voltage across the trip coil 71 of the alternator circuit breaker, thereby actuating the trip controls and opening the breaker to isolate the failed unit from the bus. As shown in FIG. 2, the activating coil 79 of the drive shutdown control 21 is also connected to be activated along with the trip coil 71, so that the drive is shut down at the same time the unit is disconnected from the bus.

During the sequence just described, the remaining units on the bus receive reverse power, which produces a signal across the output resistor 41 of a polarity opposite to that shown and thus, depending on its magnitude, may activate relay 60, which through its contacts then connects the direct current supply to the coil 65 of time delay relay 62. However, as previously explained, the time delay introduced by the relay 62 is relatively long, in the vicinity of five to ten seconds for instance, in comparison to the time required to clear the failed drive from the system, normally less than one second, so that the system returns to normal operating conditions before relay 62 can act.

Assuming now that the circuit of FIG. 2 is connected to a drive sustaining an underspeed malfunction, such as a bearing failure, which causes the drive to drag down the bus and draw reverse power from it, it will be observed that a load signal appears across output resistor 41 which is of opposite polarity to that shown. This signal is of such a polarity as to activate the coil 63 of relay 60, the relay 61 remaining unactivated by reason of the blocking diode 67. The closing of relay 60 connects the direct current supply to time delay relay 62 to activate the time delay cycle. If the failed condition persists for a preselected length of time, the time delay period expires and the relay 62 operates to complete a circuit through its contacts and conductors 72, 77, 78, 75 and 76 connecting the trip coil 71 and the drive shutdown coil 79 to the direct current supply. This causes actuation of the alternator circuit breaker 11 to disconnect the unit from the bus and actuation of the drive shutdown control coil 79 to shut off the energy supply to the drive. The remaining units continue to deliver positive power which may be of sufficient magnitude to activate their relays 61, but because the system remains at or slightly below normal frequency, the relays 58 of the frequency sensors of the other drives remain inactivated so that the trip controls of these other drives are not actuated.

Thus, it will be seen from the foregoing that the circuitry of FIG. 2 operates in the manner prescribed by the system schematic of FIG. 1. It will be recognized, of course, that the system of FIG. 1 may be mechanized in ways other than that shown in FIG. 2. For instance, the frequency sensitive network may be of another form, such as in the form of opposing twin T networks, or a frequency sensitive relay may be used directly. Similarly, the polarity and magnitude of the load may be sensed in ways other than that shown and the polarity sensitive circuitry may take a different form than that shown.

Description of System of FIG. 5

Referring now to FIG. 5, there is shown a schematic of a system which is similar to that of FIG. 1, but in which the polarity and the magnitude of the load on each alternator are sensed in an alternative manner. For purposes of illustration, only a single system is shown, it being appreciated that the complete electrical system may be composed of any desired number of units, each being provided with protective controls of the type shown. The identifying numerals employed correspond to those used to designate like elements in the system of FIG. 1.

The basic drive and alternator system is the same as that shown in FIG. 1 in that it comprises a drive and alternator combination D1 and A1 with the alternator being connected through an alternator circuit breaker 11 to a load bus 13, which is in turn connected to the paralleling bus 10 through a bus tie breaker 12. The drive speed control and real load division control are the same as illustrated in FIG. 1, the current transformer 22 being connected in a series loop with the current transformers of the other units operating in the parallel system.

As has been set out above in connection with the description of the real load division control of FIG. 1, the output of the real power detector 24 appearing at 25 is a signal which is proportional to both the direction and the magnitude of the real load division error. In the arrangement of FIG. 5, this signal is used as the input signal 25a to the polarity sensitive relays 30 and 31, which cooperate respectively with the overfrequency sensor 32 and the time delay 34 in the same manner as described in connection with FIG. 1.

Assuming now an overspeed type failure of the unit shown in FIG. 5, it will be appreciated from the earlier discussion of this type failure that the failed drive tends to assume the full system load while the remaining units receive reverse power from the bus and are carried up in speed with it. Under these conditions the real load division system of the failed drive will produce its maximum signal indicating that its unit is carrying a load in excess of system average and calling for a load decrease, while the real load division systems of the remaining drives will produce maximum signal outputs indicating loads below the system average and calling for a load increase. Thus, the output signal appearing at 25 of the real power detector 24 of the failed unit is of a polarity indicating an excess load whereas the polarity of that signal for each of the other units is opposite, indicating a load deficiency.

The polarity sensitive relay 30 is set to respond to input signals of a polarity corresponding to the excess load signal and is insensitive to signals of opposite polarity. The polarity sensitive relay 31, on the other hand, is set to respond to signals of a polarity corresponding to a load deficiency, and is insensitive to signals of opposite polarity.

Thus for overspeed type failures of the kind described, the polarity of the signal input 25a is such as to activate the polarity sensitive relay 30 on the failed drive but is of opposite polarity in the remaining systems. The attainment of a preselected overfrequency condition activates the over frequency sensors 32, thus completing, in the failed unit only, a signal path through the elements 30 and 32 to produce an output signal at 33, thereby activating the trip controls 11a of the alternator circuit breaker 11 to trip the failed unit out of the system. As has been previously explained, although the polarity sensitive relays 31 of the units which have not malfunctioned are activated during the foregoing sequence, the time delay 34 prevents the occurrence of an output signal at 33, this delay being relatively long in comparison with the time required to clear the failed unit.

For underfrequency failures, the failed unit receives reverse power so that the signal appearing at 25a is in the direction indicating a load deficiency and thus activates the polarity sensitive relay 31. Upon the expiration of the time delay, a signal path is completed through elements 31 and 34 to produce an output signal at 33 and thereby cause the failed unit to be tripped out of the system. In both the foregoing sequences, the drive shutdown control 21 may also be activated at the same time the unit is electrically isolated from the system.

Thus, it will be seen that the system of FIG. 5 operates in the same manner as that shown in FIG. 1 except that it derives its input signal from the real load division system rather than from a separate load sensing arrangement. The arrangement of FIG. 1 may be preferable in some applications, however, because that system operates without reliance upon electrical connections extending between the drives, which may in some cases be located substantial distances apart.

It will be seen from the foregoing that we provide a protective system which responds to the simultaneous occurrence of the transmission of positive power and a preselected overfrequency condition to select a failed drive in a paralleled alternator system and thereby provide system protection against runaway drives. The system also provides protection against drive failures which tend to drag down the system. This is accomplished by sensing the transmission of reverse power for more than a preselected time period which is relatively long in comparison with normal system transients and in comparison with the time required to clear an overfrequency failure.

Although we have shown several embodiments of our invention, including electrical circuitry representing one possible form of mechanization, it will be apparent from the description we have presented that our invention is not limited to the forms shown. It will be appreciated, therefore, that various modifications and changes may be made in the embodiments presented herein without departing from the true scope and spirit of our invention as defined in the appended claims.

What we claim as new and desire to secure by Letters Patent of the United States is:

1. In a system of alternators operable in parallel on a common bus and including alternator circuit breaker means for connecting and disconnecting said alternators individually to and from said bus, a protective arrangement for protecting said system against malfunctions in said alternators or their prime movers comprising means for sensing the magnitude and direction of the electric power delivered by or to each of said alternators when operating on said common bus, means for sensing the occurrence of a preselected overspeed condition in excess of the normal operating speed of said alternators, and means for operating the alternator circuit breaker of any alternator only upon the occurrence therein of the transmission of a preselected magnitude of positive power simultaneously with the existence of said preselected overspeed condition.

2. In a protective system for an alternator operable in parallel with other alternators on a common bus and having circuit breaker means for connecting and disconnecting said alternator to and from said bus, means for sensing the magnitude and direction of electrical power delivered to or by said alternator, polarity sensitive relay means connected to said power sensing means so as to repond to the transmission of a preselected magnitude of positive power out of said alternator but to be insensitive to the transmission of reverse power into said alternator, speed sensitive means producing a signal responsive to the attainment of a preselected overspeed level in excess of normal operating speed, second relay means connected to respond to the existence of a preselected magnitude of said speed sensitive signal, said polarity sensitive relay means and said second relay means being interconnected to produce an output signal from said system upon the response of both of said polarity sensitive and second relay means, and means for actuating said circuit breaker means in response to said output signal to disconnect said alternator from the common bus.

3. In a system of alternators operating in parallel on a common bus and including alternator circuit breaker means for connecting and disconnecting said alternators individually to and from said bus, means producing a first signal in response to the simultaneous occurrence in any of said alternators of the generation of positive power and the attainment of a preselected speed in excess of normal operating speed, means producing a second signal in response to the transmission for more than a pre-selected time of reverse power into any of said alternators from said common bus, and means responsive to the existence in any of said alternators of either of said first or second signals to operate such circuit breaker means to disconnect said alternator from said bus.

4. A protective arrangement for a system of paralleled alternators each connected to a common bus through alternator circuit breaker means comprising means for producing a signal in response to the existence of an excess in the power being transmitted by any of said alternators above the average of the loads being carried by all of said alternators, means for producing a signal in response to the existence of a preselected overspeed condition in excess of normal operating speeds, and means producing a signal in response only to the simultaneous existence of said excess power signal and said overspeed signal to actuate said alternator circuit breaker means and thereby disconnect said alternator from said bus.

5. A protective arrangement for a system of alternators operable in parallel on a common bus and including alternator circuit breaker means for connecting and disconnecting said alternators individually to and from said bus comprising means producing a first signal in response to the simultaneous existence of an excess in the power transmitted by any of said alternators above the average of the loads being carried by all of said alternators and a preselected overspeed condition in excess of normal operating speed, means producing a second signal in response to the existence for a preselected length of time of a power output deficiency in any of said alternators below the average of the loads being carried by all of said alternators, and means responsive to the existence in any of said alternators of either of said first or second signals to operate the alternator circuit breaker means of the alternator for which said signal exists to disconnect said alternator from said bus.

6. In a system of alternators operable in parallel on a common bus and including alternator circuit breaker means for connecting and disconnecting said alternators individually to and from said bus, a protective system associated with one of said alternators comprising means for sensing the magnitude and direction of the real power being transmitted by or to said alternator when it is operating in parallel with other alternators, means for sensing an overspeed condition of said alternator in excess of normal operating speed, first polartiy sensitive relay means connected to said power sensing means and being responsive to the transmission of positive power out of said alternator, means interconnecting said first polarity sensitive relay means, said overspeed condition sensing means, and said alternator circuit breaker means to open said circuit breaker means upon the existence of said overspeed condition and the transmission of positive power, second polarity sensitive relay means connected to said power sensing means and being responsive to the transmission of reverse power into said alternator, time delay means, and means interconnecting said second polarity sensitive relay means, said time delay means, and said alternator circuit breaker means to open said circuit breaker means upon the existence of reverse power transmission for a length of time exceeding that established by said time delay means.

References Cited in the file of this patent
UNITED STATES PATENTS

| | | |
|---|---|---|
| 1,524,562 | Kuyser | Jan. 27, 1925 |
| 2,175,874 | Caughey | Oct. 10, 1939 |
| 2,277,035 | Canetta | Mar. 24, 1942 |
| 2,322,114 | Clare | June 15, 1943 |
| 2,376,766 | Fountain | May 22, 1945 |
| 2,636,132 | Stineman | Apr. 21, 1953 |
| 2,683,849 | Schaelchlin | July 13, 1954 |
| 2,732,507 | Stineman | Jan. 24, 1956 |
| 2,829,278 | Flugstad | Apr. 1, 1958 |
| 2,872,591 | Stineman | Feb. 3, 1959 |
| 2,883,561 | Ruder | Apr. 21, 1959 |